United States Patent
Stanford

[15] 3,698,498
[45] Oct. 17, 1972

[54] DRIVE AND STEERING MECHANISM FOR TRACTORS

[72] Inventor: Robert M. Stanford, 2275 Swain Road, Stockton, Calif. 95207

[22] Filed: July 12, 1971

[21] Appl. No.: 161,753

[52] U.S. Cl. .................................. 180/6.2, 74/720.5
[51] Int. Cl. .............................................. B62d 11/10
[58] Field of Search ...... 180/6.2, 6.66, 6.7; 74/720.5, 74/710.5

[56] References Cited

UNITED STATES PATENTS 2,377,354  6/1945  Merritt ................. 74/720.5 X

FOREIGN PATENTS OR APPLICATIONS 1,364,873  5/1964  France ..................... 74/720.5

Primary Examiner—Benjamin Hersh
Assistant Examiner—John A. Pekar
Attorney—Percy S. Webster et al.

[57] ABSTRACT

A drive and steering mechanism, for a tractor which includes non-dirigible right and left drive wheels (or endless tracks) supported by axle shafts, comprising an engine-driven transmission having dual drive shafts corresponding to the axle shafts, a clutch unit in each drive shaft, a brake unit associated with each drive shaft beyond the related clutch unit, a differential corresponding to and driven by each drive shaft beyond the related brake unit, one lateral shaft of each differential being the corresponding axle shaft and the other lateral shaft being the adjacent end portion of a common shaft spanning between the differentials, and a third brake unit associated with such common shaft.

With the first-named brake units released, and the clutch units and said third brake unit engaged, the tractor is driven straight ahead, but—with selective and independent manipulation of said clutch units and brake units—the tractor can be caused to turn to right or left with a mild, sharp, or very abrupt steering action as operating conditions may dictate, and all under the effective control of the driver of the tractor.

7 Claims, 5 Drawing Figures

INVENTOR.
Robert M. Stanford
BY
Webster & Webster
ATTORNEYS 3,698,498

DRIVE AND STEERING MECHANISM FOR TRACTORS

BACKGROUND OF THE INVENTION:

It is know, of course, that a tractor with non-dirigible wheels can be steered by producing a variance in the traction effect on opposite sides of the tractor. To accomplish this, by means associated with the drive mechanism, has heretofore required very complicated and expensive supplemental apparatus. The present invention was conceived by me in seeking a simplified but reliable arrangement to attain the desired end.

SUMMARY OF THE INVENTION:

The present invention, especially designed—but not limited—for use on small or garden-type tractors, provides, as a major object, a simplified drive and steering mechanism through the medium of which the tractor driver can—by selective and independent manipulation of certain parts of such mechanism—cause the tractor, which is normally driven straight ahead, to turn to right or left with a mild, sharp, or very abrupt steering action as operating conditions may dictate, and all under the control of said tractor driver.

The present invention provides, as another object, a drive and steering mechanism, as in the preceding paragraph, for a tractor which includes non-dirigible right and left drive wheels (or endless tracks) supported by axle shafts, comprising an engine-driven transmission having dual drive shafts corresponding to the axle shafts, a clutch unit in each drive shaft, a brake unit associated with each drive shaft beyond the related clutch unit, a differential corresponding to and driven by each drive shaft beyond the related brake unit, one lateral shaft of each differential being the corresponding axle shaft and the other lateral shaft being the related end portion of a common shaft spanning between the differentials, and a third brake unit associated with such common shaft. With the first-named brake units released, and the clutch units and said third brake unit engaged, the tractor is driven straight ahead, but—with selective and independent manipulation of said clutch units and brake units for steering purposes—the resultant steering action is mild, sharp, or very abrupt as may be desired.

The present invention provides, as a further object, a drive and steering mechanism for tractors which is designed for ease and economy of manufacture.

The present invention provides, as a still further object, a practical, reliable, and durable drive and steering mechanism for tractors, and one which is exceedingly effective for the purpose for which it is designed.

DESCRIPTION OF THE PREFERRED EMBODIMENT

Figure 1:
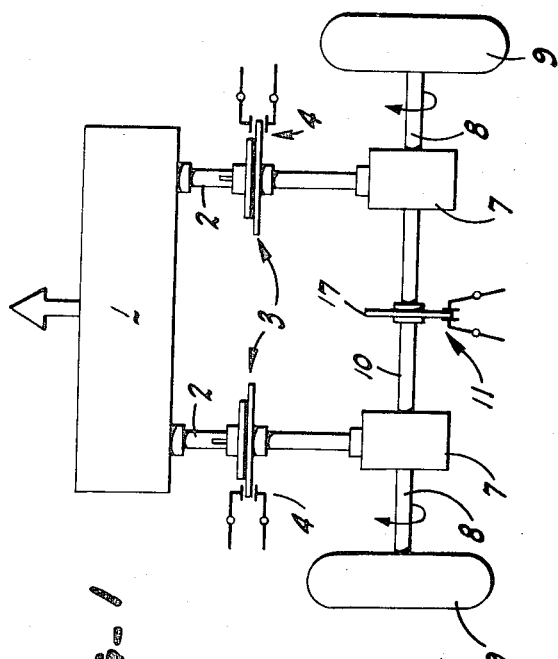
FIG. 1 is a diagrammatic plan view of the mechanism with the parts set for straight-ahead drive of the tractor.

Referring now more particularly to the drawings and to the characters of reference marked thereon, the tractor includes an engine-driven transmission 1 having a pair of parallel, transversely spaced drive shafts 2 projecting rearwardly therefrom.

Each drive shaft 2 has a clutch unit 3 interposed therein, and a brake unit 4 is also associated with each such drive shaft 2. Beyond the related brake unit 4, each drive shaft 2 is fitted with a bevel drive pinion 5 which runs in mesh with and drives the ring gear 6 of a corresponding differential 7.

The two differentials 7 are disposed in transverse alinement, and each includes an outer lateral shaft 8 which projects outwardly and carries a non-dirigible tractor wheel 9. The other or inner lateral shaft of each differential 7 is the adjacent end portion of a common transverse shaft 10 which spans between said differentials. A third brake unit 11 is associated with the common transverse shaft 10.

In the present embodiment, the clutch units 3 are each engaged by tension as illustrated by spring 12 and caused to disengage by a power cylinder 13, while the brake units 4 are each engaged by a power cylinder 14 and caused to disengage by tension as illustrated by spring 15. As shown, the fixed clutch plate 16 of each clutch unit 3 serves as a portion of the related brake unit 4.

The third brake unit 11, which includes a brake member 17 fixed on the common shaft 10, is normally engaged to prevent rotation of said common shaft—by tension as illustrated by spring 18, but is selectively releasable by a power cylinder 19.

The differentials 7 are of substantially conventional form, and each includes a case 20 on the related ring gear 6, opposed pinions 21 journaled in the case parallel to the axis of the drive shaft 2, and opposed gears 22 journaled at a right angle to such axis and running in mesh between the pinions 21. The outer gear 22 is secured to the outer lateral shaft 8, while the inner gear 22 is fixedly carried on the inner lateral shaft; i.e., the adjacent end portion of the common transverse shaft 10.

OPERATION

In order to drive the tractor straight ahead, both clutch units 3 are engaged, both brake units 4 are released, and the third brake unit 11 is engaged. In this setting of the parts, power—in the proper direction—is imparted equally from the drive shafts 2, through the differentials 7, and to the shafts 8 carrying the wheels 9.

Figure 2:
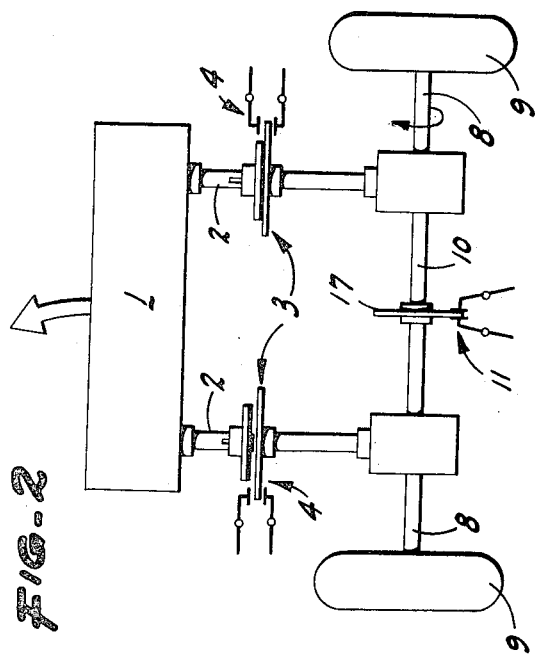

When, for example, it is desired to turn to the left with a mild steering action, the left clutch unit 3 is released so that the corresponding wheel 9 merely "free-wheels;" the mild left turn then being caused by continued forward drive of the right wheel 9. See FIG. 2.

Figure 3:
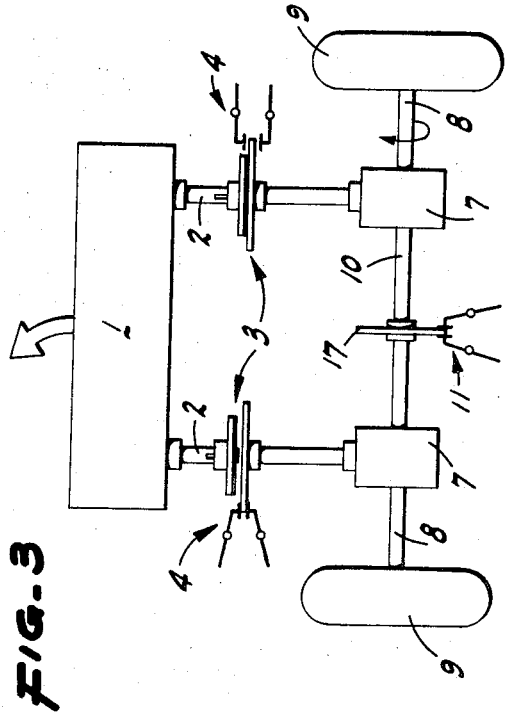
FIGS. 2, 3, and 4 are similar views but show the parts as set to accomplish—respectively—a mild, sharp, or very abrupt turn of the tractor.

If a left turn with a sharp steering action is desired, the left clutch unit 3 is released and the left brake unit 4 is engaged; the sharp left turn then being caused by continued forward drive of the right wheel 9 and braking of the left wheel 9 resulting from engagement of said left brake unit 4. See FIG. 3.

Figure 4:
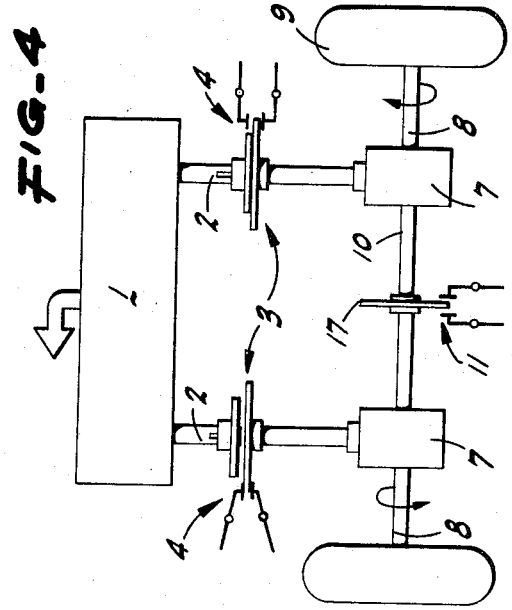
Figure 5:
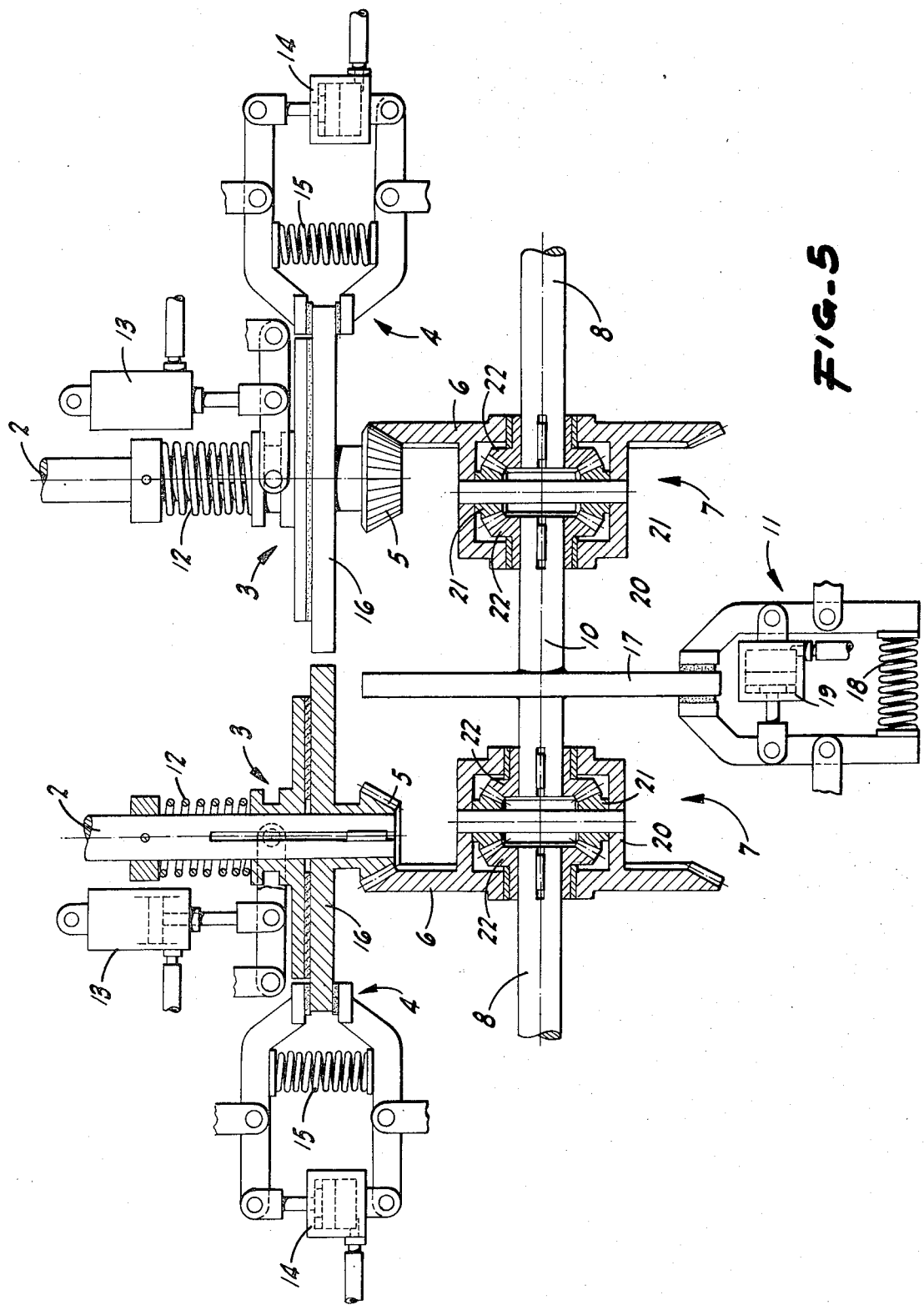
FIG. 5 is an enlarged plan view, partly broken away and partly in section, showing the mechanism in more detail.

Further, if a left turn with a very abrupt steering action is desired, the left clutch unit 3 is released, the left brake unit 4 is engaged, and the third brake unit 11 is released; the very abrupt left turn then being caused by continued forward drive of the right wheel 9, braking of the ring gear of the left differential resulting from engagement of said left brake unit 4, and a reverse drive imparted to the left wheel 9 by the left differential 7 then actuated from the right differential 7 through the medium of the common shaft 10 now rotatable due to the third brake unit 11 standing released. See FIG. 4.

When a turn to the right with a mild, sharp, or abrupt steering action is desired, the above-described settings of the parts are employed but in reference to the right clutch unit 3 and right brake unit 4 rather than those on the left side.

With the described mechanism, the operator of the tractor can determine, selectively, the steering action—left or right—best suited to any particular working condition, and can effect the necessary selective setting of the parts by the included power cylinders 13, 14, and 19; such power cylinders being independently and separately controlled—in any suitable fashion—from the driver's station on the tractor.

While, for the present description of the invention, the tractor is deemed to include only two powered wheels 9, it is apparent that such invention can be applied, with effectiveness, to a tractor of four-wheel drive or crawler type.

From the foregoing description, it will be readily seen that there has been produced such a drive and steering mechanism for tractors as substantially fulfills the objects of the invention, as set forth herein.

While this specification sets forth in detail the present and preferred construction of the drive and steering mechanism for tractors, still in practice such deviations from such detail may be resorted to as do not form a departure from the spirit of the invention, as defined by the appended claims.

I claim:

1. A drive and steering mechanism, for a tractor which includes non-dirigible right and left drive wheels supported by axle shafts, comprising an engine-driven transmission having dual drive shafts corresponding to the axle shafts, an engageable clutch unit in each drive shaft, a normally disengaged brake unit associated with each drive shaft beyond the related clutch unit, a differential corresponding to and driven by each drive shaft beyond the related brake unit, each differential including an outer lateral shaft and an inner lateral shaft, the outer lateral shaft being the corresponding axle shaft, the inner lateral shaft being a portion of shaft means connected between said differentials, a normally engaged third brake unit associated with said shaft means, and means to cause, selectively and independently, engagement of the clutch units, engagement of said first-named brake units, and disengagement of said third brake unit.

2. A mechanism, as in claim 1, in which said shaft means comprises a common shaft spanning between the differentials.

3. A mechanism, as in claim 1, in which the differentials are disposed in transverse alinement, and said shaft means comprises a common shaft spanning between such alined differentials.

4. A mechanism, as in claim 3, in which the third brake unit includes a brake member fixed on said common shaft intermediate the end portions thereof.

5. A mechanism, as in claim 3, in which the third brake unit is mounted in connection with said common shaft intermediate the end portions thereof.

6. A mechanism, as in claim 1, in which each clutch unit includes a clutch member fixed on the corresponding drive shaft, and said clutch member serving as a portion of the related brake unit.

7. A mechanism, as in claim 1, in which each differential includes a ring gear driven from the corresponding drive shaft, a case on the ring gear, opposed pinions journaled in the case for rotation about an axis parallel to said drive shaft, opposed transverse-axis gears in mesh between the pinions, and the outer lateral shaft being connected to the outer gear; said shaft means comprising a common shaft spanning between the differentials, and the end portions of said common shaft being connected to the inner gears of said differentials.

* * * * *